United States Patent [19]

Gross

[11] Patent Number: 5,120,519

[45] Date of Patent: Jun. 9, 1992

[54] SCALE CONTROL IN PHOSPHORIC ACID MANUFACTURE

[75] Inventor: Anthony E. Gross, St. Charles, Ill.

[73] Assignee: Nalco Chemical Company, Naperville, Ill.

[21] Appl. No.: 787,197

[22] Filed: Nov. 4, 1991

[51] Int. Cl.$^5$ ............................................... C01B 25/16
[52] U.S. Cl. ................................. 423/321 R; 423/320
[58] Field of Search ................. 423/321 R, 321 S, 320

[56] References Cited

U.S. PATENT DOCUMENTS 3,928,551 12/1975 Booth .............................. 423/320 X

FOREIGN PATENT DOCUMENTS 2047218 11/1980 United Kingdom ............ 423/321 R

OTHER PUBLICATIONS

Vol. 1, Parts 1 & 2, pp. 607-626 and pp. 159-209, Phosphoric Acid, Parts 1 & 2, A. U. Slack, M. Dekker, N.Y., Same as above, Ch. 4, pp. 331-359.

*Primary Examiner*—Gregory A. Heller
*Attorney, Agent, or Firm*—Robert A. Miller; John G. Premo

[57] ABSTRACT

High molecular weight copolymers of acrylamide which contain between 5-100 mole % of acrylic acid and have a molecular weight of at least 1,000,000 prevent scale adhering to surfaces in contact with digested phosphate rock and/or phosphoric acid produced from digestion.

5 Claims, No Drawings

SCALE CONTROL IN PHOSPHORIC ACID MANUFACTURE

GENERAL STATEMENT OF THE INVENTION

High molecular weight acrylamide-acrylic acid copolymers prevent scale on surfaces in contact with digested phosphate rock.

INTRODUCTION

For an overall view of the manufacture of phosphates and phosphoric acid reference may be had to the work by Becker, "Phosphates and Phosphoric Acids," copyright 1989 by Marcel Dekker, Inc. and Stack, "Phosphoric Acid, Part 1 and Part 2", copyright 1968 by Marcel Dekker, Inc.

Phosphoric acid is generally produced by taking a crude phosphate containing ore which has been upgraded or beneficiated by washing, desliming, and flotation. The beneficiated material is then ground prior to digestion in sulfuric acid. Typically to a slurry of beneficiated rock and recycle from the process, concentrated sulfuric acid is added at a rate to control the exotherm in a quantity ranging from 100 to 105% of the stoichiometric amount based on a calcium oxide calculation. After digestion is completed the digested phosphate rock is then subjected to a filtration and evaporation step and subsequent clarification step to produce finished phosphoric acid which is then converted into products ranging from fertilizer to detergent additives, animal feeds and phosphorous containing products used in the phosphatizing of steel.

One of the most bothersome problems in the digestion of phosphate rock and in the evaporation of phosphoric acid is the precipitation of solids. The precipitation occurs primarily in the evaporators and equipment associated therewith. A certain amount occurs also on other surfaces of the process including the digesters and the filtration systems. Scale formation is most troublesome when highly concentrated, e.g. about 54% $P_2O_5$ acid is produced. Particularly troublesome is scaling of heat exchanger surfaces. Most attempts to correct this problem have been directed to equipment design but even the best designed equipment is not capable of preventing scale formation.

Due to the high concentrations of calcium sulfate produced by the process, calcium sulfate is thought to be the primary ingredient of the scales caused from the digestion of phosphate rock. Another important ingredient of these scales is sodium fluosilicate. While sodium fluosilicate has been known as an ingredient in the scales associated with phosphoric acid production, it is not believed to have been known until the present invention that by preventing the formation of sodium fluosilicate scale it is possible to inhibit and substantially prevent scale formation occasioned in the production of phosphoric acid.

The present invention is predicated upon the discovery that certain water soluble anionic vinyl addition polymers are effective in inhibiting, preventing and minimizing the formation of sodium fluosilicate scales on solid surfaces in contact with digested phosphate rock and/or the phosphoric acid produced from the digestion.

THE INVENTION

My invention is a method of preventing sodium fluosilicate containing scales from forming on surfaces in contact with digested phosphate rock and/or phosphoric acid produced from the digestion which comprises treating the digested phosphate rock with a scale inhibiting amount of an anionically charged vinyl addition water soluble polymer which contains from 5 to 100 mole % and preferably 15-100 mole % of mer units from an anionic vinyl monomer and which has a molecular weight of at least 1,000,000. Most preferably, the scale inhibiting anionic water soluble vinyl addition polymers contain from 20-100 mole of mer units from an anionic vinyl monomer and have a molecular weight in excess of 5,000,000.

THE ANIONIC WATER SOLUBLE POLYMERS

As indicated, these polymers contain from between 5 to about 100 mole % of mer units from an anionic vinyl monomer. Suitable anionic monomers include acrylic acid, methacrylic acid, ethacrylic acid and 2-acrylamido-2-methyl propane sulfonic acid, as well as their alkali metal salts. These polymers may be homo or copolymers. Suitable co-monomers include non-anionic vinyl addition monomers such as acrylamide, N-substituted acrylamides, hydroxyalkyl acrylates, hydroxyalkyl methacrylates and N-vinyl formamide with the proviso being that only water soluble polymers and copolymers of the anionic monomers are intended to be covered by my invention. Monomers other than those stated above may be polymerized with the anionic vinyl monomers so long as the resultant polymer retains a net anionic charge and is water soluble and has a molecular weight of 1,000,000 or greater. In a preferred embodiment the polymers of my invention contain at least between 30 mole % of mer units derived from acrylic acid.

The polymers should have a molecular weight of at least 1,000,000. Preferably they should have a molecular weight of at least 5,000,000 with a preferred molecular weight being within the range of between 5,000,000–10,000,000. Efficacy is not diminished by higher molecular weight although as known to those skilled in the art molecular weights in excess of 25,000,000 are difficult to produce commercially and hence are not readily available. The molecular weights as set forth herein are weight average molecular weights.

The anionic water soluble vinyl addition polymer in a preferred embodiment are acrylic acid-acrylamide copolymers containing at least 20 mole % acrylic acid.

The anionic polymers and copolymers of this invention are most conveniently employed in the practice of the invention in the form of concentrated water and oil emulsions. Water and oil emulsions of water soluble vinyl polymers are well known and are described in Vanderhoff U.S. Pat. No. 3,284,393 and Anderson-Frisque Re. U.S. Pat. No. 28,474, the disclosures of these patents are incorporated herein by reference.

In the Anderson-Frisque patent it is disclosed that when the water and oil emulsions which contain the polymers are added to waters which contain water soluble surfactants rapid dissolution of the polymers is achieved. This rapid dissolution technique is well suited for preparing treating solutions which contain the high molecular weight acrylamide-acrylic acid polymers of the invention.

DOSAGE OF THE COPOLYMER

The amount of the polymers used to prevent scale will vary depending upon the particular polymer used and the severity of the scaling problem encountered, which often times is effected by the temperature of the phosphoric acid, as well as the concentration. Also a factor is the nature of the scale forming chemicals present in the phosphoric acid. As a general rule the dosage, based on active polymer, will range between 0.01–100 parts per million with a preferred dosage range usually being within the range of 1–50 parts per million. The dosage is based on the weight of the phosphoric acid solution. It may be added at any place in the phosphoric acid process line. While it may be added at the digester stage it is preferably added to the phosphoric acid going to the evaporators or to the evaporators themselves since it is at this point where the most prevalent scaling problems occur. The best place to which the polymers of acrylamide and acrylic acid are added as well as the amount can be easily adjusted using routine experimentive techniques.

EVALUATION OF THE INVENTION

It was decided to evaluate a number of known scale inhibitors both polymeric and non-polymeric to determine their efficacy in preventing the scaling tendency in the production of phosphoric acid. Below is the test procedure used to evaluate these reagents:

COUPON TEST PROCEDURE

The object of this procedure is to simulate the process of going from 28% $P_2O_5$ to 40% $P_2O_5$ acid in the first stage of evaporation. Rather than set up an evaporator in the laboratory which would be difficult to control, 61.56% $P_2O_5$ (concentrated reagent grade phosphoric acid) is added to a sample of process 28% $P_2O_5$. Additional sodium ion (NaCl) is added to give the correct stoichimetry to exceed the solubility of $Na_2SiF_6$. Coupons are cut from impregnated graphite rods of the same material as used in the evaporators. The following is the step-by-step procedure for using 28% $P_2O_5$.

1. To a 2 oz. widemouth plastic jar add 50 g of 28% $_2O_5$.
2. Equilibrate above and stock solution of 61% $P_2O_5$ to desired temperature. Usually 40° C. or 85° C.
3. Add 17.1 ml of 61% $P_2O_5$ to 2 oz. jar and mix.
4. Add 2.1 ml of 10% NaCl to 2 oz. jar and mix. Concentrations are:
   $na^+$ = 1,240 ppm
   $F^-$ = 11,100 ppm
   $Si^{+4}$ = 6,860 ppm
5. Add scale control agent and mix.
6. Add weighed coupon.
7. Let sit overnight at desired temperature.
8. Remove coupon and wash with methanol or acetone.
9. Let air dry and wight coupon with scale.
10. Clean coupon by dissolving scale in sulfuric acid.

Using the above described test method a wide variety of chemicals known to have scale inhibiting properties were tested. None of these tests showed the reagents to have any significant activities in reducing scale, particularly the sodium fluosilicate scale. These reagents are described in detail in Table 1.

TABLE 1

| Product no. | Chemistry | MW | % Actives |
|---|---|---|---|
| 1 | 80/20, acrylic acid/ methacrylate copolymer | 3700 | 27 |
| 2 | Na polyacrylate | 2300 | 25 |
| 3 | Polyacrylamide | 5–10,000,000 | 26 |
| 4 | 75/25, acrylamide/ acrylic acid | ≈10,000 | 35 |
| 5 | Ethylene dichloride/ $NH_3$ condensation polymer | 30,000 | 25 |
| 6 | Poly diallyldimethyl ammonium chloride | ≈100,000 | 20 |
| 7 | Dimethylamine Mannich amine of polyacrylamide | 5–10,000 | 10 |
| 8 | Sorbitan monolaurate-ethoxylate | | 100 |
| 9 | Amino trimethylamine phosphoric acid | | 100 |

DESCRIPTION OF INACTIVE REAGENTS

RESULTS AND DISCUSSION

Two polymers, Polymer A and Polymer B, showed activity with polymer A being the more consistent. The attached table gives the results for these products in six different tests. A typical blank coupon will pick up 0.15–0.30 g of scale and a good treated coupon will pick up 0.06 g.

The crystal structure of the bulk precipitate and the scale appear to be the same under a microscope. The scale particles however are much larger. It would be expected that products 1, 2, and 4 would work at the higher molecular weights specified for use in my invention.

Following the tests described above that produced little or no effectiveness, two high molecular weight polymers were tested using the identical test method previously described. Polymer A was an acrylamide 31 mole % sodium acrylate copolymer having a molecular weight of 5–10,000,000. It was in the form of a water-in-oil emulsion and had active polymer concentration of 28.5%. Polymer B was a polymer which contained 100% of sodium acrylate. It also had a molecular weight within the range of 5–10,000,000. It was the form of a water and oil emulsion having an active polymer content of 28.5% by weight. These two polymers were tested and the results were set forth in Table 2.

TABLE 2

| Test # | Product | Dose (ppm) | Coupon Weight Increase (g) |
|---|---|---|---|
| 1 | Blank | — | 0.213 |
| | Polymer A | 10 | 0.011 |
| | Polymer A | 10 | 0.023 |
| | Polymer A | 1 | 0.035 |
| | Polymer A | 1 | 0.225 |
| | Blank | — | 0.209 |
| | Polymer B | 10 | 0.085 |
| | Polymer B | 10 | 0.133 |
| | Blank | — | 0.183 |
| | Polymer A | 1 | 0.238 |
| | Polymer A | 1 | 0.210 |
| 2 | Blank | — | 0.245 |
| | Blank | — | 0.198 |
| | Polymer B | 10 | 0.218 |
| | Polymer B | 1 | 0.226 |
| | Polymer A | 10 | 0.000 |
| | Polymer A | 1 | 0.131 |
| 3 | Blank | — | 0.162 |
| | Blank | — | 0.100 |
| | Blank | — | 0.107 |
| | Blank | — | 0.074 |
| | Polymer B | 10 | 0.137 |
| | Polymer B | 1 | 0.025 |

TABLE 2-continued

| Test # | Product | Dose (ppm) | Coupon Weight Increase (g) |
|---|---|---|---|
| 4 | Blank | — | 0.156 |
|   | Blank | — | 0.155 |
|   | Blank | — | 0.132 |
|   | Blank | — | 0.144 |
|   | Polymer B | 10 | 0.020 |
|   | Polymer B | 1 | 0.156 |
| 5 | Polymer B | 100 | 0.015 |
|   | Polymer B | 10 | 0.023 |
|   | Polymer B | 1 | 0.052 |
| 6 | Blank | — | 0.250 |
|   | Blank | — | 0.221 |
|   | Polymer B | 100 | 0.050 |

Having thus described my invention it is claimed as follows:

1. A method of preventing sodium fluosilicate containing scales from forming on surface in contact with either digested phosphate rock or phosphoric acid, or both, produced from the digestion which comprises treating either the digested phosphate rock or the phosphoric acid, or both with a scale inhibiting amount of anionic water soluble vinyl addition polymer which has a molecular weight of at least 1,000,000 which polymer contains between 5 to 100 mole % of mer units of an anionic vinyl monomer from the group consisting of acrylic acid, methacrylic acid, ethacrylic acid and 2-acrylamido-2 methyl propane sulfonic acid, and their alkali metal salts.

2. The method of claim 1 where the anionic water soluble vinyl addition polymer has a molecular weight of at least 5,000,000.

3. The method of claim 1 where anionic water soluble vinyl addition polymer has a molecular weight of 5,000,000–10,000,000 and contains at least 30 mole % of mer units of the anionic vinyl addition monomer.

4. The method of claim 1 wherein the anionic water soluble vinyl addition polymer is a copolymer of acrylic acid and acrylamide.

5. The method of claim 4 wherein the copolymer of acrylic acid and acrylamide contains greater than 30% mer units derived from acrylic acid.

* * * * *